US006593857B1

(12) United States Patent
Roper et al.

(10) Patent No.: US 6,593,857 B1
(45) Date of Patent: Jul. 15, 2003

(54) MODULAR PROCESS TRANSMITTER HAVING A SCALABLE EMI/RFI FILTERING ARCHITECTURE

(75) Inventors: Weston Roper, St. Louis Park, MN (US); Todd M. Berge, Eden Prairie, MN (US); David G. Tyson, Eden Prairie, MN (US); Brian L. Westfield, Victoria, MN (US); Richard L. Nelson, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 337 days.

(21) Appl. No.: 09/638,181
(22) Filed: Jul. 31, 2000

Related U.S. Application Data
(60) Provisional application No. 60/156,369, filed on Sep. 28, 1999.

(51) Int. Cl.[7] ............................................. G08C 19/00
(52) U.S. Cl. ............................... 340/870.3; 340/870.4; 361/679; 361/728; 73/756
(58) Field of Search ........................... 340/870.3, 870.4, 340/870.37; 361/679, 728; 73/756

(56) References Cited

U.S. PATENT DOCUMENTS

| | | | |
|---|---|---|---|
| 3,701,280 A | 10/1972 | Stroman | 73/194 |
| 3,968,694 A | 7/1976 | Clark | 73/398 |
| 4,120,206 A | 10/1978 | Rud, Jr. | 73/718 |

(List continued on next page.)

FOREIGN PATENT DOCUMENTS

| | | |
|---|---|---|
| DE | 91 09 176.4 | 10/1991 |
| DE | 197 45 244 A1 | 4/1998 |
| DE | 299 03 260 U1 | 5/2000 |
| EP | 0 063 685 A1 | 11/1982 |
| EP | 0 214 801 A1 | 3/1987 |
| EP | 0 223 300 A2 | 5/1987 |

(List continued on next page.)

OTHER PUBLICATIONS

Product Data Sheet No: 00813-0100-4378, "Model 751 Field Signal Indicator", by Rosemount Inc., Eden Prairie, Minnesota, (1997).

Product Data Sheet No: 00813-0100-4731, "APEX™ Radar Gauge", by Rosemount Inc., Eden Prairie, Minnesota, (1998).

Product Data Sheet No: 00813-0100-4640, "Model 3201 Hydrostatic Interface Unit", from the Rosemount Comprehensive Product Catalog, published 1998, by Rosemount Inc., Eden Prairie, Minnesota.

(List continued on next page.)

Primary Examiner—Michael Horabik
Assistant Examiner—Albert K. Wong
(74) Attorney, Agent, or Firm—Westman, Champlin & Kelly

(57) ABSTRACT

A modular process transmitter having a scalable EMI/RFI filtering architecture includes a unitized sensor module and a transmitter module. The unitized sensor module is adapted to operate as a stand-alone process transmitter. The transmitter module can couple to the unitized sensor module to expand the capabilities of the unitized sensor module. The unitized sensor module includes a sensor housing, a sensor circuit and a removable sensor EMI/RFI filtering circuit. The sensor circuit provides a sensor output in accordance with either a local format or a first communication protocol. The sensor EMI/RFI filtering circuit filters noise in accordance with the first communication protocol. The transmitter module includes a transmitter module housing, a communications circuit, and a transmitter module EMI/RFI filtering circuit. The communications circuit is adapted to receive the sensor output from the sensor circuit in the local format and generate a scalable output in accordance with a second communication protocol. The transmitter module EMI/RFI filtering circuit is adapted to replace the sensor EMI/RFI filtering circuit and filter noise in accordance with the second communication protocol.

31 Claims, 6 Drawing Sheets

U.S. PATENT DOCUMENTS

| | | | |
|---|---|---|---|
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| 4,617,607 A | 10/1986 | Park et al. | 361/283 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 181/12.2 R |
| 5,035,140 A | 7/1991 | Daniels et al. | 73/290 |
| 5,051,937 A | 9/1991 | Kawate et al. | 364/571.01 |
| 5,058,437 A | 10/1991 | Chaumont et al. | 73/861.21 |
| 5,060,108 A | 10/1991 | Baker et al. | 361/283 |
| 5,070,732 A | 12/1991 | Duncan et al. | 73/431 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 364/463 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,276,631 A | 1/1994 | Popovic et al. | 364/571.04 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,502,659 A | 3/1996 | Braster et al. | 364/571.01 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,669,713 A | 9/1997 | Schwartz et al. | 364/557 |
| 5,670,722 A | 9/1997 | Moser et al. | 73/756 |
| 5,677,476 A | 10/1997 | McCarthy et al. | 73/29.01 |
| 5,710,552 A | 1/1998 | McCoy et al. | 340/870.21 |
| 5,754,596 A | 5/1998 | Bischoff et al. | 375/295 |
| 5,763,787 A * | 6/1998 | Gravel et al. | 345/442 |
| 5,764,928 A | 6/1998 | Lancott | 395/285 |
| 5,823,228 A | 10/1998 | Chou | 137/597 |
| 5,870,695 A | 2/1999 | Brown et al. | 702/138 |
| 5,899,962 A | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,685 A | 9/1999 | Gravel et al. | 73/866.5 |
| 5,973,942 A | 10/1999 | Nelson et al. | 363/21 |
| 5,983,727 A | 11/1999 | Wellman et al. | 73/724 |
| 5,988,203 A | 11/1999 | Hutton | 137/597 |
| 6,006,338 A | 12/1999 | Longdorf et al. | 713/340 |
| 6,038,927 A | 3/2000 | Karas | 73/706 |
| 6,050,145 A | 4/2000 | Olson et al. | 73/706 |
| 6,059,254 A | 5/2000 | Sundet et al. | 248/678 |
| 6,089,097 A * | 7/2000 | Frick et al. | 73/718 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,131,467 A | 10/2000 | Miyano et al. | 73/756 |
| 6,140,952 A | 10/2000 | Gaboury | 341/143 |
| 6,151,557 A | 11/2000 | Broden et al. | 702/47 |
| 6,176,138 B1 * | 1/2001 | Barr et al. | 73/756 |
| 6,216,172 B1 | 4/2001 | Kolblin et al. | 709/253 |
| 6,233,532 B1 | 5/2001 | Bourdreau et al. | 702/89 |
| 6,272,931 B1 * | 8/2001 | Nimberger | 73/756 |
| 6,285,964 B1 | 9/2001 | Babel et al. | 702/121 |
| 6,295,875 B1 | 10/2001 | Frick et al. | 73/718 |
| 6,311,568 B1 | 11/2001 | Kleven | 73/861.42 |
| 6,321,166 B1 | 11/2001 | Evans et al. | 702/50 |
| 6,389,904 B1 * | 5/2002 | Petrich et al. | 73/756 |
| 6,415,188 B1 | 7/2002 | Fernandez et al. | 700/67 |
| 6,421,570 B1 | 7/2002 | McLaughlin et al. | 700/2 |

FOREIGN PATENT DOCUMENTS

| | | |
|---|---|---|
| EP | 0 268 742 A1 | 7/1987 |
| EP | 0 639 039 A1 | 2/1995 |
| EP | 0 903 651 A1 | 3/1999 |
| JP | 401313038 A | 12/1989 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |

OTHER PUBLICATIONS

Product Data Sheet No: 00813–0100–4003, "Model 8800A", by Rosemount Inc., Eden Prairie, Minnesota, (1998).

Product Data Sheet No: 00813-0100-4773, "Model 8742C—Magnetic Flowmeter Transmitter with Foundation™ Fieldbus", from the Rosemount Comprehensive Product Catalog, published 1998, by Rosemount Inc., Eden Prairie, Minnesota.
"Rosemount Model 8732C Magnetic Flowmeter Transmitter", by Rosemount Inc., Eden Prairie, Minnesota, (1998).
Product Data Sheet No: 00813-0100-4263, "Model 444 Alphaline® Temperature Transmitters", by Rosemount Inc., Eden Prairie, Minnesota, (1997).
Product Data Sheet No: 00813-0100-4769, "Model 3244MV Multivariable Temperature Transmitter with Foundation™ Fieldbus", by Rosemount Inc., Eden Prairie, Minnesota, (1998).
Product Data Sheet No: 00813-0100-4724, "Models 3144 and 3244MV Smart Temperature Transmitters", by Rosemount Inc., Eden Prairie, Minnesota, (1998).
Product Data Sheet No: 00813-0100-4738, "Model 3095FB Multivariable™ Transmitter with Modbus™ Protocol", by Rosemount Inc., Eden Prairie, Minneosta, (1996, 1997).
Product Data Sheet No: 00813-0100-4001, "Model 3051 Digital Pressure Transmitter for Pressure, Flow, and Level Measurement", by Rosemount Inc., Eden Prairie, Minnesota, (1998).
Product Data Sheet No: 00813-0100-4698, "Model 2090F Sanitary Pressure Transmitter", by Rosemount Inc., Eden Prairie, Minnesota, (1998).
Product Data Sheet No: 00813-0100-4690, "Model 2088 Economical Smart Pressure Transmitter", by Rosemount Inc., Eden Prairie, Minnesota, (1998).
Product Data Sheet No: 00813-0100-4592, "Model 2024 Differential Pressure Transmitter", by Rosemount Inc., Eden Prairie, Minnesota, (1987–1995).
Product Data Sheet No: 00813-0100-4458, "Model 1135F Pressure-to-Current Converter", by Rosemount Inc., Eden Prairie, Minnesota, (1983, 1986, 1994).
"Single Chip Senses Pressure and Temperature," *Machine Design*, 64 (1992) May 21, No. 10.
Brochure: "Reduce Unaccounted-For Natural Gas with High-Accuracy Pressure Transmitters," Rosemount Inc. Measurement Division, Eden Prairie, Minnesota, ADS 3073, 5/91, pp. 1–4.
Technical Information Bulletin, "Liquid Level Transmitter Model DB40RL Sanitary Sensor deltapilot," Endress + Hauser, Greenwood, Indiana, 9/92, pp. 1–8.
"The Digitisation of Field Instruments" W. Van Der Bijl, *Journal A*, vol. 32, No. 3, 1991, pp. 62–65.
Specification Summary, "Teletrans™ 3508–30A Smart Differential Pressure Transmitter," (undated) Bristol Babcock, Inc., Watertown, CT, 06795.
Specification Summary, "Teletrans™ 3508–10A Smart Presure Trasmitter," (undated) Bristol Babcock, Inc., Watertown, CT, 06795.
Specification Summary, "AccuRate Advanced Gas Flow Computer, Model GFC 3308," (undated) Briston Babcock, Inc., Watertown, CT, 06795.
Product Data Sheet PDS 4640, "Model 3201 Hydrostatic Interface Unit," Mar. 1992, Rosemount Inc., Eden Prairie, MN 55344.
Product Data Sheet PDS 4638, "Model 3001CL Flush–Mount Hydrostatic Pressure Transmitter," Jul. 1992, Rosemount Inc., Eden Prairie, MN 55344.

"Flow Measurement," *Handbook of Fluid Dynamics*, V. Streeter, Editor–in–chief, published by McGraw–Hill Book Company, Inc. 1961, pp. 14–4 to 14–15.
"Precise Computerized In–Line Compressible Flow Metering," *Flow—Its Measurement and Control in Science and Industry*, vol. 1, Part 2, Edited by R. Wendt, Jr., Published by American Institute of Physics et al, (undated) pp. 539–540.
"A Systems Approach," Dr. C. Ikoku, *Natural Gas Engineering*, PennWell Books, (undated) pp. 256–257.
"Methods for Volume Measurement Using Tank–Gauging Devices Can Be Error Prone," F. Berto, *The Advantages of Hydrostatic Tank Gauging Systems*, undated reprint from *Oil & Gas Journal*.
"Hydrostatic Tank Gauging—Technology Whose Time Has Come," J. Berto, *Rosemount Measurement Division Product Feature*, undated reprint from *Intech*.
"Pressure Sensors Gauge Tank Level and Fluid Density," *Rosemount Measurement Division Product Feature*, undated reprint from *Prepared Foods*, (Copyrighted 1991 by Gorman Publishing Company).
"Low Cost Electronic Flow Measurement System," *Tech Profile*, May 1993, Gas Research Institute, Chicago, IL.
"Development of an Integrated EFM Device for Orifice Meter Custody Transfer Applications," S.D. Nieberle et al., *American Gas Association Distribution/Transmission Conference & Exhibit*, May 19, 1993.
Advertisement, AccuRate Model 3308 Integral Smart DP/P/T Transmitter, (undated) Bristol Babcock, Inc., Watertown, CT 06795.
Advertisement, Model 3508 DP Transmitter, *Control Engineering*, Dec. 1992, Bristol Babcock, Inc., Watertown, CT 06795.
"Smart Transmitters Tear Up The Market," C. Polsonetti, *Intech*, Jul. 1993, pp. 42–45.
American National Standard, "Hydraulic Fluid Power–Solenoid Piloted Industrial Valves–Interface Dimensions for Electrical Connectors", National Fluid Power Association, Inc., 10 pages, (Aug. 1981).
"MicroLAN Design Guide", Dallas Semiconductor, Tech Brief N. 1, (undated).
"Bosch CAN Specification Version 2.0", by Robert Bosch GmbH, pp. 1–68 including pp. –1–and –2–, (Sep. 1991).
Product Data Sheet No. 00813-0100-4360, "Model 1151 Alphaline® Pressure Transmitters", by Rosemount Inc., (1997)
Product Data Sheet No. 00813-0100-4001, "Digital Pressure Transmitter for Pressure, Flow and Level Measurement", by Rosemount Inc., (1998).
"Claudius Ptolemy (100?–170? AD)", *M&C News*, 7 pages, (Apr. 1994).
U.S. application No. 09/862,762, filed May 21, 2001, entitled "Sigma–Delta Analog To Digital Converter For Process Transmitter".
U.S. application No. 09/867,961, filed May 30, 2001, entitled "Environmentally Sealed Service Block".
2 pages downloaded from http://www.interlinkbt.com/PRODUCT/IBT_PROD/DN/CN–DM_PN/EURO–D-P.HTM dated Sep. 15, 2000.
4 pages downloaded from http://www.interlinkbt.com/PRODUCT/IBT_PROD/dn/EUR–CON/euro–fwc.htm dated Sep. 15, 2000.

3 pages from TURK Cable Standards, by Turk, Inc., Minneapolis, Minnesota.

Form PCT/ISA/220 (3 pages) from Form PCT/ISA/210 (3 pages) from the International Searching Authority of the European Patent Office, relating to International Application No. PCT/US 01/13993, date of mailing Nov. 22, 2001.

Official Search Report of the European Patent Office in foreign application No. PCT/US 01/14521 filed May 4, 2001.

* cited by examiner

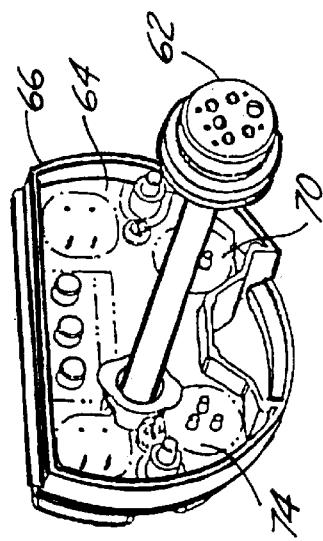
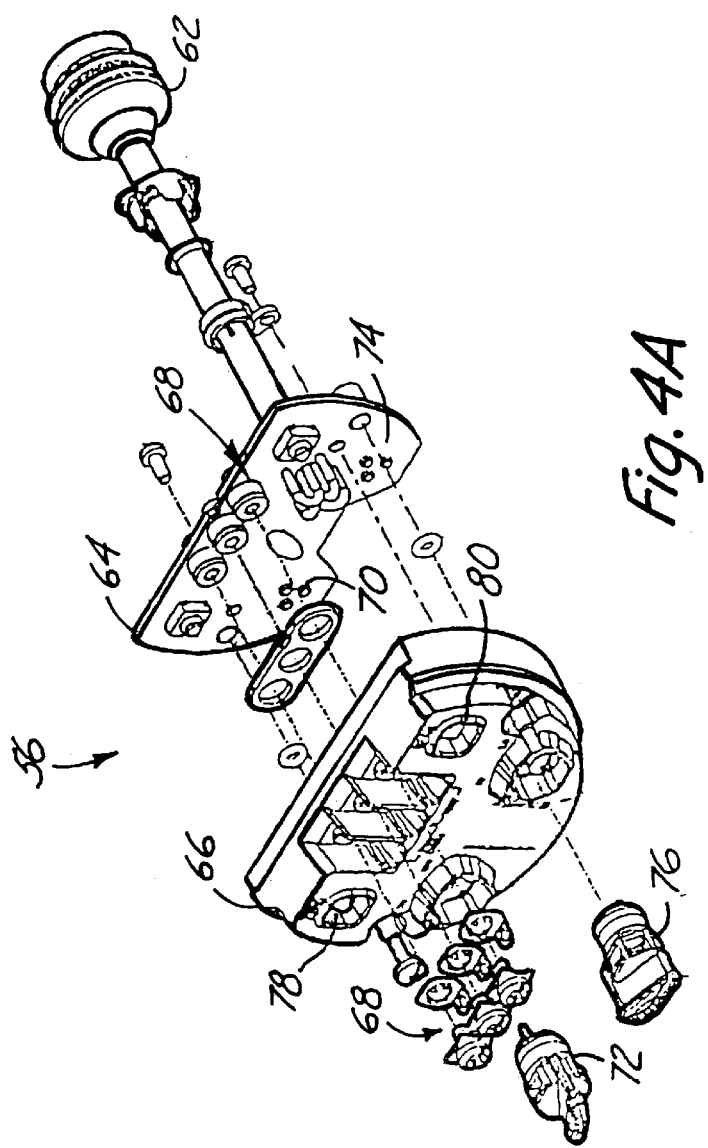
Fig. 4A
Fig. 4B

MODULAR PROCESS TRANSMITTER HAVING A SCALABLE EMI/RFI FILTERING ARCHITECTURE

CROSS-REFERENCE TO RELATED APPLICATION

The present application claims the benefit of U.S. Provisional Application having serial No. 60/156,369, filed on Sep. 28, 1999 and entitled "UNITIZED MODULARITY IN A PROCESS TRANSMITTER".

BACKGROUND OF THE INVENTION

The present invention relates to process transmitters used to measure process variables in industrial processing plants. More particularly, the present invention relates to a modular process transmitter comprised of interchangeable modules.

Industrial processing plants, such as chemical, pulp, petroleum, gas, pharmaceutical, food, and other processing plants use process transmitters to measure various process variables and communicate process variable information to a control system. These process variables can include pressure, temperature, flow, level, pH, conductivity, turbidity, density, concentration, chemical composition, and other properties of fluids. FIG. 1 is used to illustrate an example of a processing plant environment which includes various process transmitters. Process transmitters such as flow meter 2 in process fluid line 4, level transmitters 6 and 8 on tank 10, and a differential pressure transmitter 12 in process line 14, are shown electrically connected to control system 16 through a communication bus or control loop 18. Control system 16 is typically located in a remote process control room. Control system 16 can be configured to control, and receive process variable information from, the process transmitters over communication busses or control loops 18, in accordance with a communication protocol.

Process transmitters typically include a sensor portion having a sensor housing containing sensor circuitry, and a transmitter portion having a transmitter housing containing transmitter circuitry. The sensor portion is generally adapted to measure a process variable such as those mentioned above. The transmitter portion is generally configured to receive process variable information from the sensor circuitry and transmit the process variable information to a control system. The transmitter portion can also transmit and receive other information relating to, for example, the settings of the process transmitter. The process variable and other information is generally communicated in accordance with a standardized communication protocol.

Current process transmitter designs are not configured to allow the sensor portion to couple to add-on transmitter portions from other product lines or other manufactures. Such an ability could provide a way to enhance the capabilities of the process transmitter without the need for significant modifications. The primary reasons for this inability to "modularize" a process transmitter is due to a lack of standardized features that would allow the sensor portion to be compatible with various transmitter portions and vice versa. Some of these non-standardized features include the manner of physically connecting the sensor portion to the transmitter portion, the seals used to protect the sensor and transmitter portions, and the software and electrical interfaces between the sensor and transmitter portions.

Additionally, current sensor portions cannot operate as stand-alone units that are capable of transmitting the process variable information to the control system. One reason for this is that the sensor housing is typically open to the inside of the transmitter housing to some extent to allow wires to pass through a threaded joint that provides a flameproof connection between the two housings. It would not be practical in a plant environment to run field wiring directly to the sensor housing without the use of a transmitter housing because the sensor housing, by itself, is not sealed and flameproofed from the environment. Additionally, the sensor circuitry, by itself, is not able to transmit information over a long distance.

It would be desirable to provide a process transmitter configuration where the sensor portion can operate in a field environment as a stand-alone process transmitter. Such a "unitized sensor module" could measure process variables and communicate with the remotely located control system without the previously required transmitter portion. Furthermore, it would be desirable to configure the unitized sensor module to interface with add-on transmitter modules, from other product lines or other manufacturers, which expand the capabilities of the process transmitter. For example, the transmitter modules could expand the communications used by the transmitter and the functions it is capable of performing. When a transmitter module is coupled to the unitized sensor module, the unitized sensor module could operate as a sensor portion and the transmitter module could operate as a transmitter portion. However, this configuration could lead to problems dealing with "noise" in the process transmitter.

Noise, produced by electromagnetic interference (EMI) and radio frequency interference (RFI), is often encountered in the design and operation of electronic equipment. EMI/RFI, as it is commonly known, can cause electronic equipment to function improperly or even fail. Process transmitters can pick up EMI/RFI from many different sources. One such source is the long wires of the control loop that connect the process transmitter to the process control system. These wires can act as antennas which receive radio signals thereby generating noise, in the form of high frequency current.

In order to reduce noise in the system, the transmitter circuitry includes EMI/RFI filtering circuitry that is generally adapted to create a bypass for the noise by forming a capacitive coupling between the transmitter circuitry and a circuit common, such as the housing of the process transmitter. This capacitive coupling provides a low-impedance path through which high frequency noise-related current is encouraged to pass prior to reaching the electronics of the process transmitter. The type of EMI/RFI filtering circuitry used by the process transmitter depends, at least in part, on the communication protocol the transmitter circuitry utilizes.

Since the unitized sensor module and the transmitter module each require EMI/RFI filtering circuitry, the use of dual noise filters might be contemplated when the unitized sensor module is coupled to a transmitter module. The existence of dual noise filters can present several problems. For instance, since the capacitive couplings associated with each of the noise filters are connected to circuit common, two separate paths exist for fault current to travel to the circuit common or ground. As a result, fault protection circuitry that is intended to protect the electronics of the process transmitter from fault conditions could be bypassed and, thus, rendered useless. This is a particularly unacceptable condition for process transmitters which often must meet strict intrinsic safety requirements due to the volatility of the environments in which they may operate. Additionally, dual EMI/RFI filters can create an undesirable ground loop, where an induced current passes from one grounding point to another grounding point, due to the dual connections to circuit common or ground. Furthermore, the existence of dual EMI/RFI filtering circuits could affect the performance of each, thus nullifying the particular EMI/RFI filtering solution being used by the process transmitter.

SUMMARY

A modular process transmitter is provided that overcomes the problems described above. One aspect of the modular process transmitter of the present invention is directed to a sealed unitized sensor module that includes a sensor housing, a sensor circuit, a feedthrough, and a removable sensor EMI/RFI filtering circuit. The sensor housing includes a cavity and a fitting that is adapted to support a transmitter module. The sensor circuit is contained in the cavity and includes a sensor output that is indicative of a process variable and is produced in accordance with either a local format or a first communication protocol. The feedthrough seals the fitting and includes feedthrough conductors which are coupled to the sensor circuit. The removable sensor EMI/RFI filtering circuit is located externally to the sensor housing and is configured to create a bypass for noise in accordance with the first communication protocol.

Another aspect of the modular process transmitter of the present invention is directed to a transmitter module that includes a transmitter module housing, a communications circuit, and a transmitter module EMI/RFI filtering circuit. The transmitter module housing is mountable to the fitting of the sensor housing. The communications circuit is contained in the transmitter module housing and is couplable to the feedthrough conductors. The communications circuit is adapted to receive the sensor output from the sensor circuit, in the local format, through the feedthrough conductors and generate a scalable output in accordance with a second communication protocol. The transmitter module EMI/RFI filtering circuit is adapted to replace the sensor EMI/RFI filtering circuit and create a bypass for noise in accordance with the second communication protocol.

BRIEF DESCRIPTION OF THE DRAWINGS

FIGS. 4a and 4b show an exploded front perspective view and a rear perspective view, respectively, of a terminal block in accordance with various embodiments of the invention.

DETAILED DESCRIPTION

The present invention relates to a modular process transmitter having a scalable EMI/RFI filtering architecture. In a first configuration the modular process transmitter includes a sealed unitized sensor module (unitized sensor module) which can operate as a stand-alone process transmitter in the field of a processing plant. In a second configuration of the process transmitter, an add-on transmitter module is coupled to the unitized sensor module to expand the capabilities of the process transmitter. The unitized sensor module includes a sensor circuit that is adapted to measure or sense a process variable and produce a sensor output signal that is indicative of the measured or sensed process variable. When the unitized sensor module is operating in the first configuration as a stand-alone process transmitter, it can transmit the sensor output to a remotely located control system in accordance with a first communication protocol. However, when a transmitter module is coupled to the unitized sensor module, as in the second configuration, the unitized sensor module can provide the sensor output to the transmitter module in accordance with a format that can be recognized by a communications circuit of the transmitter module. In this configuration, the communications circuit generates a scalable output which can be communicated to the control system in accordance with a second communication protocol.

The sensor circuit and the communications circuit utilize sensor EMI/RFI filtering circuitry and transmitter module EMI/RFI filtering circuitry, respectively, that allows the sensor and communications circuits to operate within the limits of the communication protocols that they are to implement. As discussed above, it is undesirable to have each of the EMI/RFI filtering circuits present in the process transmitter because they would provide dual fault paths for fault current to travel, which could cause the fault protection circuitry of the process transmitter to fail. Additionally, the presence of both EMI/RFI filtering circuits could nullify the particular noise filtering solution used by the transmitter module to meet the requirements of the second communication protocol.

The present invention avoids the problems associated with having dual EMI/RFI filtering circuits by making the sensor EMI/RFI filtering circuitry removable and externally accessible. When a transmitter module is mounted to the unitized sensor module, the sensor EMI/RFI filtering circuitry is replaced with the transmitter module EMI/RFI filtering circuitry without having to break the seal of the unitized sensor module. Therefore, the resulting process transmitter that is formed of a unitized sensor module and a transmitter module will include only a single EMI/RFI filtering circuit, thereby avoiding the problems discussed above.

Figure 2:
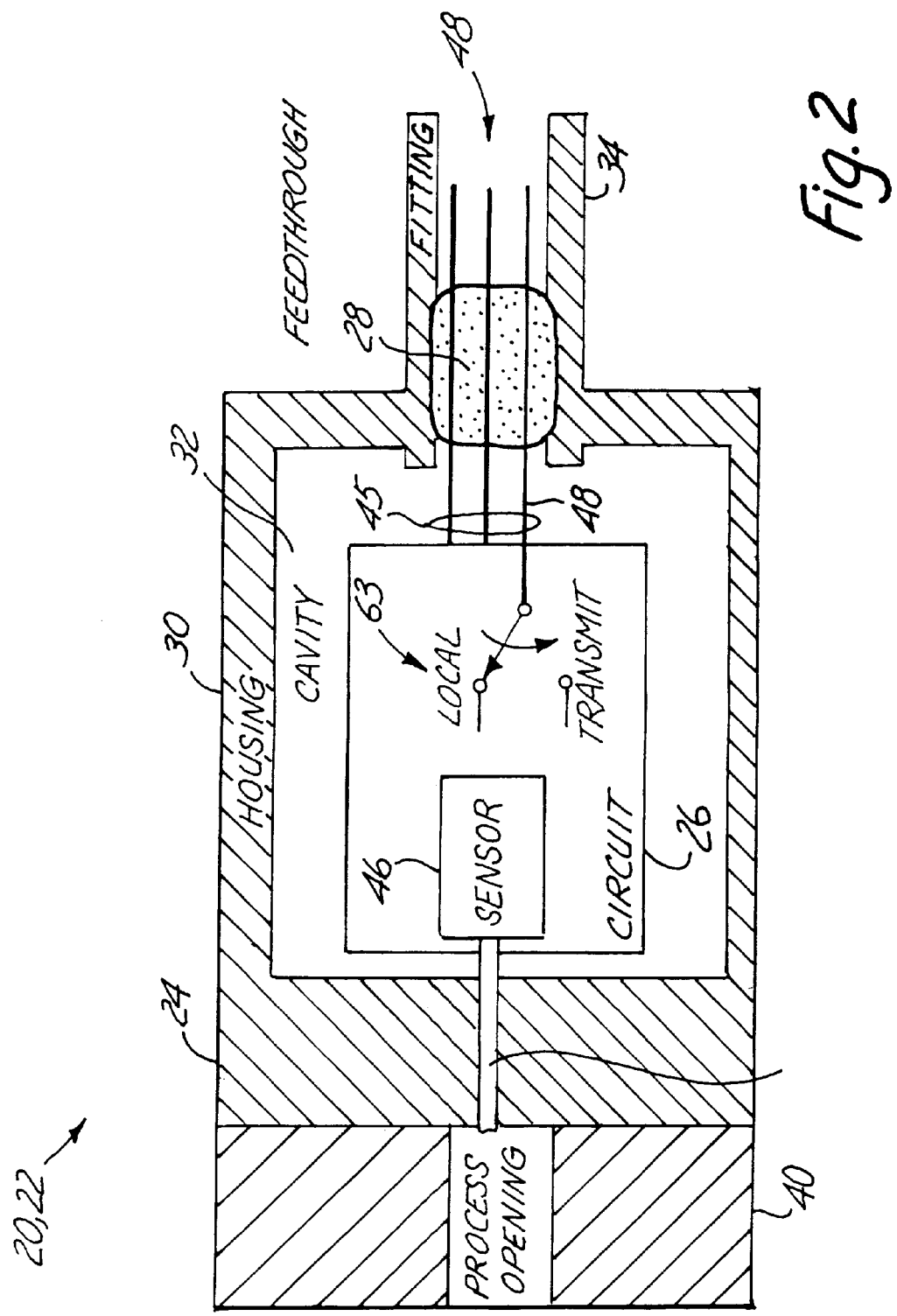
FIG. 2 is a simplified block diagram of a unitized sensor module in accordance with various embodiments of the invention.
Figure 3:
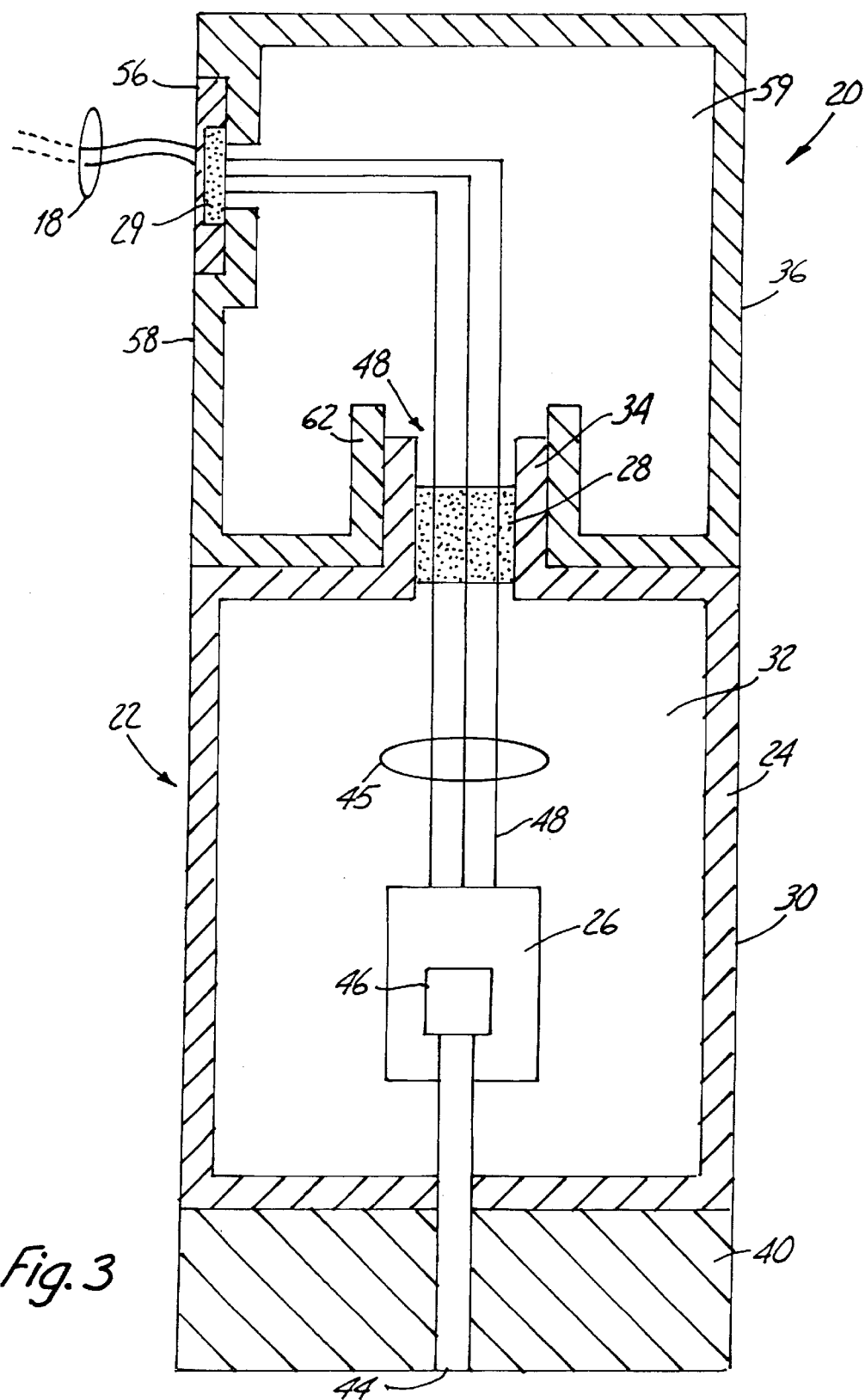
FIG. 3 is a simplified block diagram of a process transmitter in the first configuration in accordance with various embodiments of the invention.

FIG. 2 shows a simplified block diagram of a process transmitter 20 comprising a unitized sensor module 22 in accordance with one embodiment of the invention. Unitized sensor module 22 includes sensor housing 24, sensor circuit 26, feedthrough 28, and sensor EMI/RFI filtering circuit 29 (FIG. 3). Sensor housing 24 includes outer wall 30 that surrounds cavity 32 and fitting 34. Sensor housing 24 is preferably formed of metal, has a wall thickness of at least two millimeters, is fully (hermetically) sealed, and is flameproof and explosion proof. Fitting 34 is preferably integral with, or welded to, outer wall 30 so that no seals are needed at the joint between fitting 34 and outer wall 30. Fitting 34 is preferably adapted to couple to, and support, cover 36 (FIG. 3) when operating as a stand-alone process transmitter and scalable transmitter module 38 (FIG. 5) when process transmitter 20 is in the second configuration.

Figure 5:
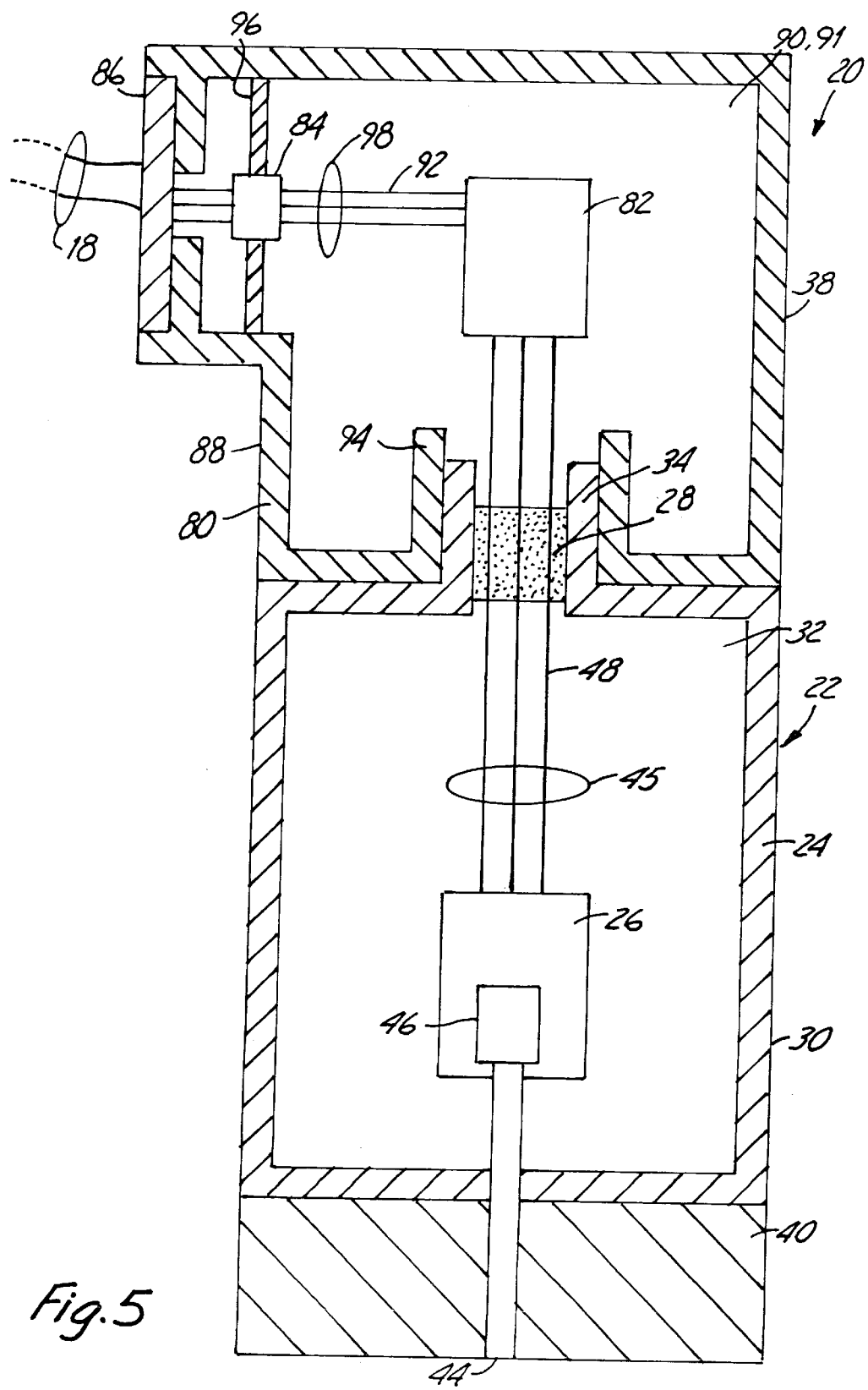
FIGS. 5 and 6 are block diagrams of a process transmitter in the second configuration in accordance with various embodiments of the invention.

Depending on the application for unitized sensor module 22, sensor housing 24 can be configured to attach unitized sensor module 22 to process component 40, as shown in FIGS. 2, 3 and 5. Process component 40 includes, for example, flanges, pipes, tanks, and the like. If applicable, sensor housing 24 can include an impulse or gauge line 42 that is adapted to couple unitized sensor module 22 to process opening 44 of process component 40. This configuration is generally used to allow unitized sensor module 22 to sense a process variable, such as pressure, at a point or location within a process.

Figure 1:
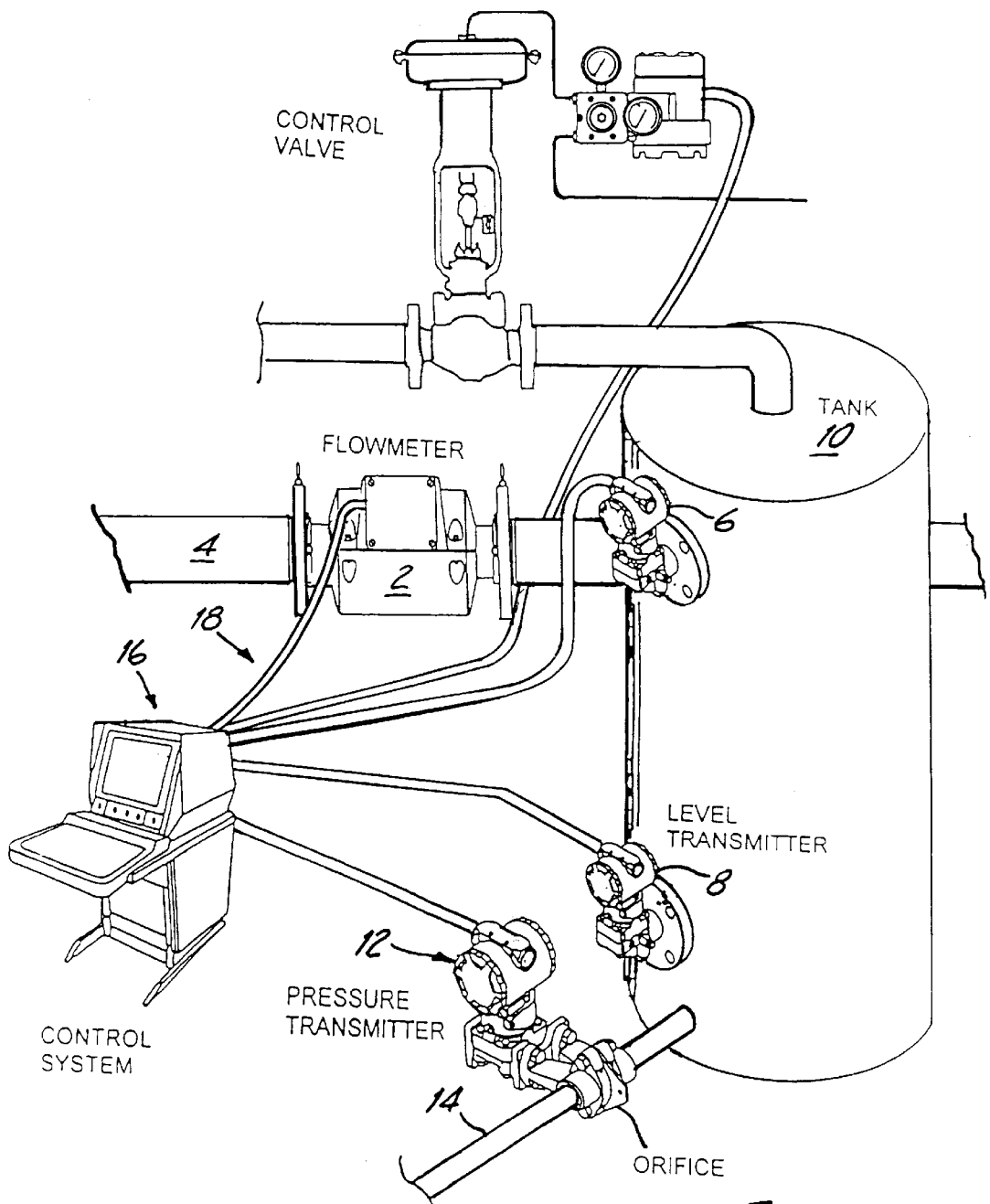
FIG. 1 shows an environment for process transmitters.

Sensor circuit 26 of unitized sensor module 22 can be contained in cavity 32. Sensor circuit 26 can send and receive information, such as process variable information and process transmitter setting information, and is energized through feedthrough conductors 45 or other means known to those skilled in the art. The setting information can relate to the configuration of unitized sensor module 22 and, for example, could include zero and span output settings and other settings which are understood by those skilled in the art. Although only three feedthrough conductors 45 are shown to simplify the illustration, additional conductors may be used as necessary. Sensor circuit 26 can include sensor 46 which is adapted to sense a process variable, such as pressure, at process opening 44 through, for example, impulse line 42. Sensor 46 can produce a sensor signal that is indicative of the sensed process variable. Alternatively, sensor circuit 26 can receive a sensor signal from a sensor (not shown) that is located externally to sensor housing 24 via an available feedthrough. Sensor circuit 26 generates at least one sensor output 48 that is provided to at least one feedthrough conductor 45 and is representative of the sensor signal. Sensor circuit 26 can be adapted to provide sensor output 48 to processing electronics located externally to unitized sensor module 22, such as a process control system 16 (FIG. 1) in accordance with a first communication protocol or a communications circuit in accordance with a local format, as will be discussed in greater detail below.

Feedthrough 28, shown in FIGS. 2, 3 and 5, is installed in opening 48 of fitting 34 to seal fitting 34 so that unitized sensor module 22 is completely sealed and is suitable for installations in the field without cover 36 (FIG. 3). Feedthrough 28 can be, for example, a glass-to-metal feedthrough through which feedthrough conductors 45 extend and are accessible by processing electronics (not shown) located externally to unitized sensor module 22. Feedthrough conductors 45 can be configured to mate with a plug, such as plug 62 shown in FIGS. 4A and 4B, for convenient connection to process control loop 18 (FIG. 1), terminal block 56 (FIGS. 3, 4A and 4B), transmitter module 38 (FIG. 5), and other processing electronics (not shown) located externally to unitized sensor module 22.

FIG. 3 shows one embodiment where cover 36 is mounted on unitized sensor module 22 in accordance with the first configuration of process transmitter 20. The numbers used in FIG. 3 that are the same or similar to the numbers used to identify features of the unitized sensor module 22 shown in FIG. 2 are intended to identify the same or similar features in FIG. 3. Cover 36 includes outer wall 58 surrounding cavity 59 and first hub 62 which is adapted to mount on fitting 34 of unitized sensor module 22. Terminal block 56 is coupled to outer wall 58 of cover 36 and conductors 45. Terminal block 56 generally simplifies the connection of unitized sensor module 22 to external processing electronics, such as control system 16 (FIG. 1) by joining the appropriate conductors 45 to process control loop 18. Cover 36 can also include a removable cap (not shown) to cover, and possibly flameproof, terminal block 56.

As mentioned above, sensor circuit 26 can be configured to communicate information, such as transmitter settings and sensor output 48, over a long distance to remotely located processing electronics in accordance with a first communication protocol. The first communication protocol could be in accordance with a standard two-wire 4–20 mA analog signal; a digital protocol such as FOUNDATION™ Fieldbus, Controller Area Network (CAN), or Profibus; or a combination protocol where a digital signal is superimposed upon an analog signal, such as with the Highway Addressable Remote Transducer (HART®) protocol. Additionally, sensor circuit 26 can be adapted to communicate information, such as sensor output 48, locally, such as to a scalable transmitter module 38 mounted to unitized sensor module 22, in accordance with a local format. Switch 63 of sensor circuit 26 can be controlled by configuration commands to set the protocol used by sensor circuit 26 between the first communication protocol and the local format, as indicated in FIG. 2.

The above-mentioned communication protocols each have specific EMI/RFI filtering requirements which must be satisfied for the communication protocols to operate properly. For example, the two-wire 4–20 mA communication protocol requires EMI/RFI filtering in accordance with the Frequency Shift Keying (FSK) Physical Layer Specification HCF_SPEC-54, revision 8.1, whereas the FOUNDATION™ Fieldbus communication protocol requires EMI/RFI filtering in accordance with the International Physical Layer Standard, International Electrotechnical Commission (IEC) 1158-2-1993 and the Foundation Fieldbus 31.25 kbit/s Physical Layer Profile Rev. 1.3, Doc FF-817. The filtering requirements of the first communication protocol used by unitized sensor module 22 are satisfied by removable sensor EMI/RFI filtering circuit 29.

Sensor EMI/RFI filtering circuit 29 is generally configured to, at least in part, create a bypass for noise in accordance with the first communication protocol. The bypass is typically formed of a capacitive coupling between, for example, a feedthrough conductor 45 and a circuit common, such as sensor housing 24. Since those skilled in the art understand how to implement the electronics circuits for the specific EMI/RFI filtering that is required for a given communication protocol, detailed schematics of the EMI/RFI filtering circuits used by the present invention are not shown. Additionally, those skilled in the art understand that EMI/RFI filters utilizing different filtering methods such as, for example, digital signal processing or active filtering methods, could be used to provide the desired noise filtering. The capacitive coupling provides a low-impedance path through which EMI/RFI high frequency noise-related current (noise) is encouraged to pass prior to reaching sensor circuit 26 of unitized sensor module 22. Sensor EMI/RFI filtering circuit 29 is removable so that it may be replaced by a suitable EMI/RFI filtering circuit that is capable of performing noise filtering in accordance with a second communication protocol that is used by transmitter module 38. In one embodiment, sensor EMI/RFI filtering circuit 29 couples to cover 36, preferably at terminal block 56. Here, sensor EMI/RFI filtering circuit 29 can be removed from unitized sensor module 22 simply by removing cover 36.

FIGS. 4A and 4B show an embodiment of terminal block 56 that includes plug 62, circuit board 64 and plastic shroud 66. Plug 62 is generally configured to mate with feedthrough conductors 45 at fitting 34 of unitized sensor module 22. Plug 62 includes conductors (not shown) which couple feedthrough conductors 45 (FIG. 2) to circuit board 64. Circuit board 64 can include terminals 68, first connection 70 for security jumper 72, second connection 74 for alarm jumper 76, and additional inputs for zero and span buttons 78 and 80. Additionally, circuit board 64 can include sensor EMI/RFI filtering circuit 29. Plastic shroud 66 covers and provides an interface for circuit board 64. Terminals 68 are generally used to couple transmitter 20 to external processing electronics, such as control system 16 (FIG. 1) through a two-wire process control loop 18, as shown in FIG. 3.

Security jumper 72 can be configured to allow an operator to prevent transmitter 20 from being calibrated from a remote location. Alarm jumper 76 is generally used to set a high or a low analog alarm level to indicate that a failure in process transmitter 20 has been detected. Zero and span buttons 78 and 80 can be used by an operator to set zero and span levels for unitized sensor module 22.

FIG. 5 shows an embodiment of process transmitter 20 in accordance with the second configuration where a scalable transmitter module 38 is mounted to unitized sensor module 22. Scalable transmitter module 38 can be selected from a number of scalable transmitter modules, each providing a unique combination of features, thereby allowing process transmitter 20 to be customized to a specific need. Thus, one may select a scalable transmitter module 38 that expands upon the features of the unitized sensor module 22 to form a process transmitter 20 that provides the desired features. For example, scalable transmitter module 38 can allow process transmitter 20 to communicate with control system 16 (FIG. 1) in accordance with a second communication protocol that is different from the first communication protocol provided by unitized sensor module 22 when acting as a stand-alone process transmitter 20.

Scalable transmitter module 38 generally includes transmitter module housing 80, communications circuit 82, transmitter module EMI/RFI filtering circuit 84, and terminal block 86. Transmitter module housing 80 includes outer wall 88 surrounding cavity 90 which contains communications circuit 82. Hub 94 is adapted to mount to fitting 34 of unitized sensor module 22 and can form a flameproof seal to protect cavity 90 of transmitter module housing 80. Transmitter module housing 80 can also include plate 96 which is used to seal compartment 91 to protect communications circuit 82 from contamination.

Communications circuit 82 couples to conductors 45 through, for example, a plug such as plug 62 shown in FIGS. 4A and 4B, to place communications circuit 82 in electronic communication with sensor circuit 26 of unitized sensor module 22. Communications circuit 82 is generally adapted to receive sensor output 48 from sensor circuit 26 and produce a scalable output 92, which can be provided to external processing electronics, such as control system 16 (FIG. 1) or a display (not shown), through terminal block 86 in accordance with a second communication protocol. Communications circuit 82 can also convert sensor output 48 to a two-wire output adapted for transmission to control system 16 (FIG. 1) over a control loop 18, as shown in FIG. 5. The second communication protocol is generally different from the first communication protocol used by unitized sensor module 22 and can be selected from any of the above-mentioned communication protocols. As a result, for optimization, scalable transmitter module 38 requires a different EMI/RFI filtering circuit than sensor EMI/RFI filtering circuit 29 used by unitized sensor module 22.

Scalable transmitter module 38 can be installed on unitized sensor module 22 by mounting hub 94 to fitting 34 after removing cover 36. This replaces sensor EMI/RFI filtering circuit 29 with transmitter module EMI/RFI filtering circuit 84. In one embodiment, transmitter module EMI/RFI filtering circuit 84 is mounted to plate 96 and is coupled to conductors 98 through which communications circuit 82 transmits information, such as scalable output 92, in accordance with the second communication protocol. As with sensor EMI/RFI filtering circuit 29, transmitter module EMI/RFI filtering circuit 84 generally provides a bypass for noise in accordance with the second communication protocol. The bypass can be formed by a capacitive coupling between, for example, a conductor 98 and a circuit common (generally transmitter module housing 80). The capacitive coupling provides a low-impedance path through which noise is encouraged to pass prior to reaching communications circuit 82. As mentioned above, since those skilled in the art understand how to implement the specific EMI/RFI filtering that is required for a given second communication protocol, detailed schematics of transmitter module EMI/RFI filtering circuit 84 are not shown.

Figure 6:
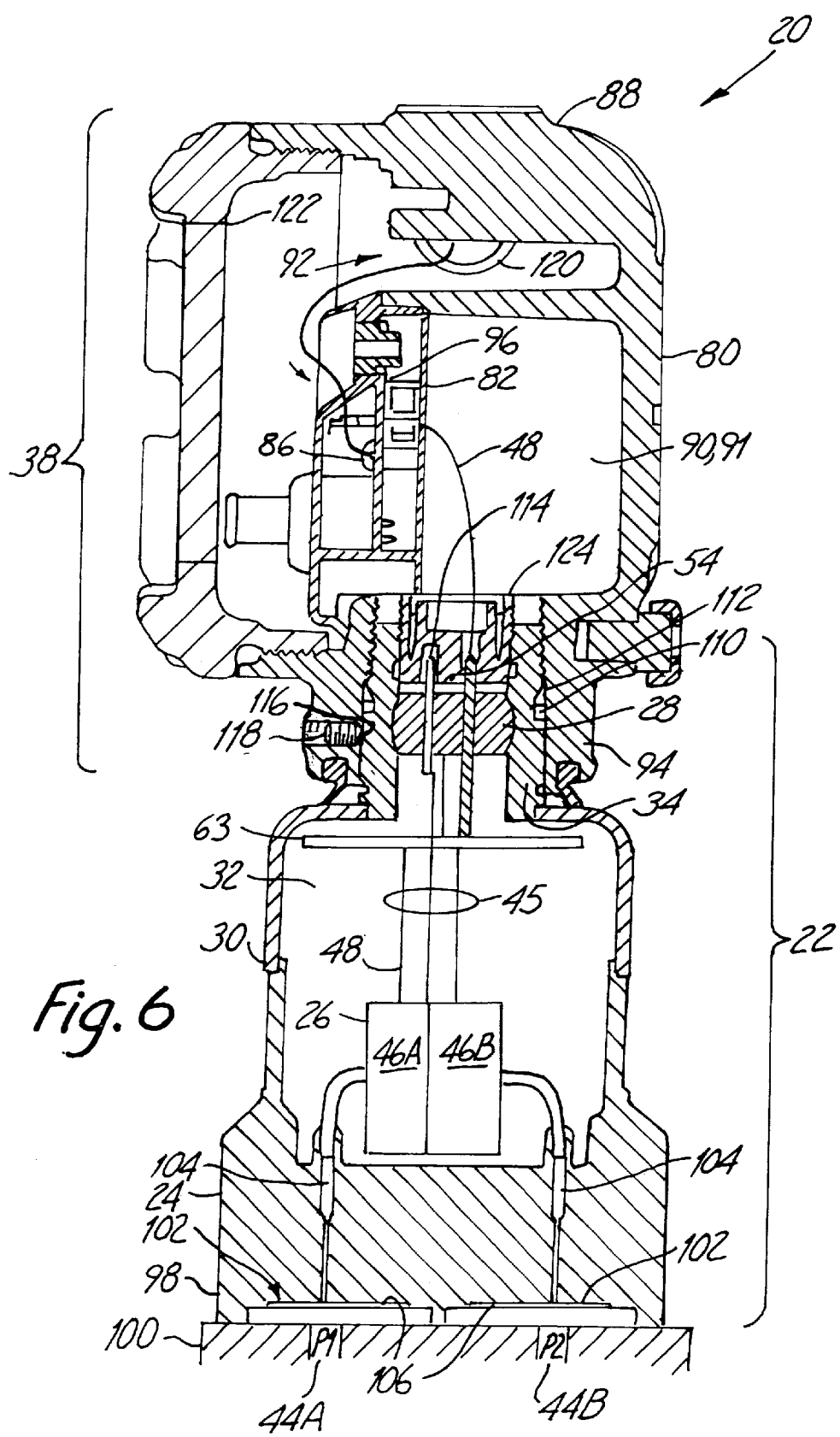

FIG. 6 shows a cross-sectional diagram of an example of a process transmitter 20 in the second configuration, depicted as a pressure transmitter, to further illustrate various embodiments of unitized sensor module 22 and scalable transmitter module 38. The numbers used in FIG. 6 that are the same as the numbers used to identify features of the invention in FIGS. 2–5 are used to identify the same or similar features in FIG. 6. In one embodiment, sensor housing 24 includes coplanar mounting flange portion 98. Coplanar mounting flange portion 98 can be secured to a mating coplanar inlet flange 100 having two process openings 44A and 44B. Process openings 44A and 44B are adapted to carry fluid of the process that is to be monitored or measured by process transmitter 20. Isolators 102 isolate the process fluid with pressure P1 from sensor 46A and pressure P2 from sensor 46B of sensor circuit 26. Isolators 102 include isolator diaphragms 106 which deflect in response to the pressures P1 and P2. Passageways 104 are shaped to be flameproof and are filled with a suitable incompressible fluid, such as silicone, to couple sensors 46A and 46B to isolator diaphragms 106 and pressures P1 and P2. Sensors 46A and 46B can be, for example, piezoresistive-based or capacitive-based pressure sensors which produce sensor signals that are used by sensor circuit 26 to establish a differential pressure measurement between pressures P1 and P2. Alternatively, a single differential pressure sensor (not shown) can be substituted for sensors 46A and 46B to measure the differential pressure.

Sensor circuit 26 is configured to produce sensor output 48 relating to the differential pressure sensed by sensors 46A and 46B. Communications circuit 82 is adapted to receive sensor output 48 and generate scalable output 92 that is indicative of the sensor output 48. The scalable output 92 can be provided to external processing electronics in accordance with the second communication protocol. The noise filtering required by the second communication protocol can be met by transmitter module EMI/RFI filtering circuit 84 (FIG. 5).

Continuing to refer to FIG. 6, fitting 34 of unitized sensor module 22 includes outer surface 110 that is adapted to form a seal with an interior surface of hub 94 of scalable transmitter module 38. Capillary tube 114 extends through feedthrough 28 and is typically used during manufacture to test the hermeticity of cavity 32. Capillary tube 114 can also be used to evacuate cavity 32 and fill cavity 32 with a non-corrosive gas such as dry air or a nonflammable gas such as dry nitrogen. Capillary tube 114 can also be used for a feedthrough conductor or a grounding conductor. After testing, evacuating, and/or filling cavity 32, capillary tube 114 can be sealed by welding or glassing. Outer surface 110 of fitting 34 can also include set screw surface 116 adapted to permit rotation of at least 360 degrees of set screw 118 on transmitter module 38. Fitting 34 can be adapted to mate with plug 124 which couples feedthrough conductors 45 to field wiring such as control loop 18 (FIG. 1), terminal block 56 (FIG. 3), or communications circuit 82 of scalable transmitter module 38.

In one embodiment, transmitter module housing 80 includes second hub 120 that is adapted for connection to a remote receiver through a wiring raceway. Hubs 94 and 120 open to cavity 90. Transmitter module housing 80 can include removable cover 122 to provide a flameproof seal to protect terminal block 86 and cavity 90. If necessary, plate 96 can be used to seal compartment 91 to protect communications circuit 82. Plate 96 can be further adapted to include transmitter module EMI/RFI filtering circuit 84, as illustrated in FIG. 5.

Although the present invention has been described with reference to preferred embodiments, workers skilled in the art will recognize that changes may be made in form and detail without departing from the spirit and scope of the invention. The appended claims are therefore intended to cover all such changes and modifications as fall within the true spirit and scope of the invention.

What is claimed is:

1. A modular process transmitter, comprising:
   a sensor housing having a cavity and a fitting that is opened to the cavity and adapted to support a transmitter module housing;
   a sensor circuit contained in the cavity having a sensor output that is indicative of a process variable and is produced in accordance with one of a local format and a first communication protocol;
   a feedthrough sealing the fitting and including feedthrough conductors which are coupled to the sensor circuit; and
   a removable sensor EMI/RFI filtering circuit located externally to the sensor housing and configured to create a bypass for noise in accordance with the first communication protocol.

2. The modular process transmitter of claim 1, further comprising:
   a transmitter module housing mountable to the fitting;
   a communications circuit contained in the transmitter module housing and couplable to the feedthrough conductors, the communications circuit being adapted to receive the sensor output and generate a scalable output in accordance with a second communication protocol; and
   a transmitter module EMI/RFI filtering circuit adapted to replace the sensor EMI/RFI filtering circuit and create a bypass for noise in accordance with the second communication protocol.

3. The modular process transmitter of claim 1, wherein the first communication protocol is selected from the group consisting of 4–20 mA, HART®, FOUNDATION™ Fieldbus, CAN, and profibus communication protocols.

4. The modular process transmitter of claim 2, wherein the second communication protocol is selected from the group consisting of 4–20 mA, HART®, FOUNDATION™ Fieldbus, CAN, and profibus communication protocols.

5. The modular process transmitter of claim 1, further comprising a first terminal block removably coupled to the sensor housing and including the sensor EMI/RFI filtering circuit and externally accessible terminals coupled to the feedthrough conductors.

6. The modular process transmitter of claim 1, wherein the sensor circuit includes a sensor coupled to a process opening of the housing.

7. The modular process transmitter of claim 5, wherein the terminals of the first terminal block include first and second terminals couplable to a process control loop.

8. The modular process transmitter of claim 7, wherein the sensor circuit is powered by energy received from the process control loop through the first and second terminals.

9. The process transmitter of claim 7, wherein the sensor output is provided to external processing electronics over the process control loop in accordance with the first communication protocol.

10. The modular process transmitter of claim 2, further comprising a second terminal block coupled to the transmitter module housing and including externally accessible terminals coupled to the communications circuit and the transmitter module EMI/RFI filtering circuit.

11. The modular process transmitter of claim 10, wherein the externally accessible terminals of the second terminal block include first and second terminals couplable to a process control loop.

12. The modular process transmitter of claim 11, wherein the sensor circuit and the communications circuit are powered by energy received from the process control loop through the first and second terminals.

13. The modular process transmitter of claim 11, wherein the scalable output is provided to external processing electronics over the process control loop in accordance with the second communication protocol.

14. The modular process transmitter of claim 2, further including a plate which seals a compartment, containing the communications circuit, within the transmitter module housing when the transmitter module housing is mounted to the sensor housing.

15. The modular process transmitter of claim 14, wherein the transmitter module EMI/RFI filtering circuit is coupled to the plate.

16. The modular process transmitter of claim 1, wherein the sensor EMI/RFI filtering circuit directs the noise to the sensor housing.

17. The modular process transmitter of claim 2, wherein the transmitter module EMI/RFI filtering circuit directs the noise to the transmitter module housing.

18. A method of manufacturing a modular process transmitter, comprising:
   providing a sensor housing having a cavity and a fitting that is opened to the cavity and adapted to support a transmitter module housing;
   forming a sensor circuit in the cavity having a sensor output that is indicative of a process variable and is produced in accordance with a first communication protocol;
   forming a feedthrough sealing the fitting and including feedthrough conductors which are coupled to the sensor circuit; and
   providing a removable sensor EMI/RFI filtering circuit that is located externally to the sensor housing and is configured to create a bypass for noise in accordance with the first communication protocol.

19. The method of claim 18, further including:
   providing a transmitter module housing mountable to the fitting;
   forming a communications circuit in the transmitter module housing;
   coupling the communications circuit to the feedthrough conductors, the communications circuit being adapted to receive the sensor output and generate a scalable output in accordance with a second communication protocol; and
   replacing the sensor EMI/RFI filtering circuit with a transmitter module EMI/RFI filtering circuit that is configured to create a bypass for noise in accordance with the second communication protocol.

20. The method of claim 18, wherein the first communication protocol is selected from the group consisting of 4–20 mA, HART®, FOUNDATION™ Fieldbus, CAN, and profibus communication protocols.

21. The method of claim 19, wherein the second communication protocol is selected from the group consisting of 4–20 mA, HART®, FOUNDATION™ Fieldbus, CAN, and profibus communication protocols.

22. The method of claim 18, wherein the sensor circuit includes a sensor coupled to a process opening of the housing.

23. A transmitter module for use with a sensor module of a process transmitter, the sensor module being adapted to produce a sensor output, in accordance with a first communication protocol, that is indicative of a process variable, the scalable transmitter module comprising:

a transmitter module housing mountable to the sensor module;

a communications circuit contained in the transmitter module housing and couplable to feedthrough conductors of the sensor module, the communications circuit being adapted to receive the sensor output and generate a scalable output in accordance with a second communication protocol; and a transmitter module EMI/RFI filtering circuit adapted to replace a sensor EMI/RFI filtering circuit and configured to create a bypass for noise in accordance with the second communication protocol.

24. The transmitter module of claim 23, wherein the second communication protocol is selected from the group consisting of 4–20 mA, HART®, FOUNDATION™ Fieldbus, CAN, and profibus communication protocols.

25. The transmitter module of claim 23, further comprising a terminal block coupled to the transmitter module housing and including externally accessible terminals coupled to the communications circuit, wherein the transmitter module EMI/RFI filtering circuit is coupled to the terminal block.

26. The transmitter module of claim 25, wherein the terminals of the terminal block include first and second terminals which are couplable to a process control loop.

27. The transmitter module of claim 26, wherein the transmitter module and the sensor module are powered by energy received over the process control loop through the first and second terminals.

28. The transmitter module of claim 26, wherein the scalable output is provided to external processing electronics over the process control loop in accordance with the second communication protocol.

29. The transmitter module of claim 23, wherein:

the transmitter module housing includes a plate which seals a compartment within the transmitter module housing when the transmitter module housing is mounted to the sensor housing; and the communications circuit is contained within the compartment.

30. The transmitter module of claim 29, wherein the transmitter module EMI/RFI filtering circuit is coupled to the plate.

31. The transmitter module of claim 23, wherein the transmitter module EMI/RFI filtering circuit directs the noise to the transmitter module housing.

* * * * *

UNITED STATES PATENT AND TRADEMARK OFFICE
CERTIFICATE OF CORRECTION

PATENT NO. : 6,593,857 B1                                      Page 1 of 1
DATED      : July 15, 2003
INVENTOR(S) : Weston Roper et al.

It is certified that error appears in the above-identified patent and that said Letters Patent is hereby corrected as shown below:

<u>Title page,</u>
Item [56], References Cited, U.S. PATENT DOCUMENTS, insert:

| | | |
|---|---|---|
| -- 09/671,495 | 09/00 | Behm et al. |
| 09/519,781 | 03/00 | Nelson et al. |
| 09/520,292 | 03/00 | Davis et al. |
| 09/519,912 | 03/00 | Nelson et al. |
| 09/672,338 | 09/00 | Nelson et al. |
| 09/571,111 | 05/00 | Westfield et al. |
| 09/564,506 | 05/00 | Nord et al. |
| 09/667,289 | 09/00 | Westfield et al. |
| 09/667,399 | 09/00 | Behm et al. |
| 09/671,130 | 09/00 | Fandrey et al. |
| 29/120,531 | 09/00 | Fandrey et al. |
| 29/120,544 | 03/00 | Fandrey et al. |
| 29/120,538 | 03/00 | Fandrey et al. |
| 29/120,552 | 03/00 | Fandrey et al. |
| 29/120,537 | 03/00 | Fandrey et al. |
| 29/120,553 | 03/00 | Fandrey et al. -- |

Signed and Sealed this

Sixth Day of April, 2004

JON W. DUDAS
*Acting Director of the United States Patent and Trademark Office*